(12) United States Patent
Kim et al.

(10) Patent No.: US 10,604,003 B2
(45) Date of Patent: Mar. 31, 2020

(54) HYDRAULIC PRESSURE SUPPLY SYSTEM OF AUTOMATIC TRANSMISSION FOR HYBRID VEHICLE AND COOLING THE JACKET OF A MOTOR WITH LOW PRESSURE SUPPLY TO LOW PRESSURE PART

(71) Applicant: HYUNDAI MOTOR COMPANY, Seoul (KR)

(72) Inventors: Jong Hyun Kim, Yongin-si (KR); Youngchul Kim, Gwangmyeong-si (KR); Hee Ra Lee, Anyang-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 592 days.

(21) Appl. No.: 15/373,908

(22) Filed: Dec. 9, 2016

(65) Prior Publication Data

US 2018/0086197 A1    Mar. 29, 2018

(30) Foreign Application Priority Data

Sep. 26, 2016   (KR) .......................... 10-2016-0123280

(51) Int. Cl.
*B60K 11/02*        (2006.01)
*F16H 57/04*        (2010.01)
(Continued)

(52) U.S. Cl.
CPC .............. *B60K 11/02* (2013.01); *B60L 1/003* (2013.01); *B60L 1/02* (2013.01); *B60L 3/0061* (2013.01);
(Continued)

(58) Field of Classification Search
CPC ........ F04B 49/06; F04B 39/064; B60K 11/02; B60L 1/003; B60L 1/02; B60L 3/0061; H02K 9/193; B60Y 2200/92; B60Y 2306/05; F01M 2005/004; F16H 57/0441; F16H 57/0446; F16H 61/0031; F16H 57/0476; F16H 57/0435; Y10S 903/903
(Continued)

(56) References Cited

U.S. PATENT DOCUMENTS 2,963,032  A  *  12/1960  Kenney .................. F01D 17/26
                                                 417/287
4,198,820  A  *   4/1980  Roth ....................... F04B 47/04
                                                 417/904
(Continued)

FOREIGN PATENT DOCUMENTS

CN          1854567 A      11/2006
CN        101109442 A       1/2008
(Continued)

*Primary Examiner* — Jermele M Hollington
*Assistant Examiner* — Maged M Almawri
(74) *Attorney, Agent, or Firm* — Brinks Gilson & Lione

(57) ABSTRACT

Disclosed is a hydraulic pressure supply system of an automatic transmission for a hybrid vehicle. A hydraulic pressure supply system of an automatic transmission for a hybrid vehicle pumps oil stored in an oil pan using an oil pump to supply the oil to a high pressure part and a low pressure part. The hydraulic pressure supply system includes a separate motor/generator cooling route which uses an oil flow recirculated in a line regulator valve and an another oil flow recirculated in a reducing valve.

4 Claims, 3 Drawing Sheets

(51) Int. Cl.
*B60L 1/02* (2006.01)
*B60L 3/00* (2019.01)
*F16H 61/02* (2006.01)
*B60L 1/00* (2006.01)
*H02K 9/193* (2006.01)
*F16H 61/00* (2006.01)
*F01M 5/00* (2006.01)

(52) U.S. Cl.
CPC ..... *F16H 57/0435* (2013.01); *F16H 57/0476* (2013.01); *F16H 61/0206* (2013.01); *H02K 9/193* (2013.01); *B60L 2240/425* (2013.01); *B60Y 2200/92* (2013.01); *B60Y 2306/05* (2013.01); *F01M 2005/004* (2013.01); *F16H 57/0441* (2013.01); *F16H 57/0446* (2013.01); *F16H 61/0031* (2013.01); *F16H 2061/0037* (2013.01); *Y02T 10/641* (2013.01); *Y02T 10/642* (2013.01); *Y10S 903/903* (2013.01)

(58) Field of Classification Search
USPC ......... 310/52, 54, 58, 59, 60 A; 417/26, 372
See application file for complete search history.

(56) References Cited

U.S. PATENT DOCUMENTS

| | | | |
|---|---|---|---|
| 4,611,973 A * | 9/1986 | Birdwell | F04B 15/02 417/342 |
| 7,543,695 B2 * | 6/2009 | Redelman | F16H 57/04 180/9.1 |
| 7,695,254 B2 * | 4/2010 | Asai | F04C 11/008 310/88 |
| 8,857,188 B2 | 10/2014 | Noda et al. | |
| 9,291,078 B2 * | 3/2016 | Wi | F01M 1/16 |
| 9,464,711 B2 * | 10/2016 | Lee | F16H 61/0025 |
| 9,890,847 B2 * | 2/2018 | Gardner | F16H 57/0435 |
| 2006/0223670 A1 * | 10/2006 | Nishikawa | B60K 6/387 477/168 |
| 2009/0148310 A1 * | 6/2009 | Satake | E02F 9/226 417/228 |
| 2010/0170689 A1 * | 7/2010 | Wagner | F04B 9/12 173/177 |
| 2013/0209285 A1 * | 8/2013 | Ladron de Guevara Rangel | F04B 7/00 417/279 |
| 2014/0060679 A1 * | 3/2014 | Wi | F01M 1/16 137/565.3 |
| 2014/0119948 A1 * | 5/2014 | Wi | F04B 23/04 417/26 |
| 2015/0167837 A1 * | 6/2015 | Lee | F16H 61/0025 74/473.11 |

FOREIGN PATENT DOCUMENTS

| | | |
|---|---|---|
| CN | 103671004 A | 3/2014 |
| CN | 103671892 A | 3/2014 |
| JP | 2007-269315 A | 10/2007 |
| JP | 2010-126073 A | 6/2010 |
| JP | 2011-027246 A | 2/2011 |
| KR | 10-2005-0036828 A | 4/2005 |
| KR | 10-2014-0055266 A | 5/2014 |
| KR | 10-1461922 B1 | 11/2014 |
| KR | 10-2015-0071610 A | 6/2015 |
| KR | 10-2016-0069608 A | 6/2016 |
| WO | 2012/060117 A1 | 5/2012 |

* cited by examiner

HYDRAULIC PRESSURE SUPPLY SYSTEM OF AUTOMATIC TRANSMISSION FOR HYBRID VEHICLE AND COOLING THE JACKET OF A MOTOR WITH LOW PRESSURE SUPPLY TO LOW PRESSURE PART

CROSS-REFERENCE TO RELATED APPLICATION

This application claims priority to and the benefit of Korean Patent Application No. 10-2016-0123280 filed in the Korean Intellectual Property Office on Sep. 26, 2016, the entire contents of which are incorporated herein by reference.

BACKGROUND

(a) Field

The present disclosure relates to a hydraulic pressure supply system of an automatic transmission.

(b) Description of the Related Art

An environmentally-friendly technology of a vehicle is a core technology on which a survival of a future vehicle industry depends. Developed vehicle manufacturers devote all their energy to developing environmentally-friendly vehicles to accomplish environment and fuel consumption regulations.

Therefore, the vehicle manufacturers develop an electric vehicle (EV), a hybrid electric vehicle (HEV), and a fuel cell electric vehicle (FCEV) as a future oriented vehicle technology.

Since the above-described future oriented vehicle has many technical restrictions such as a weight and costs, as an alternative for a practical problem to satisfy exhaust gas regulation and improve fuel consumption performance, the vehicle manufactures have focused on a hybrid vehicle in order to be competitive for commercializing the hybrid vehicle.

The hybrid vehicle is a vehicle which uses two or more energy sources and may be combined by various methods. As the energy source, a gasoline engine or a diesel engine which uses fossil fuel and a motor/generator which is driven by an electrical energy are mixed to be used.

The hybrid vehicle uses the motor/generator which has a relatively good low torque characteristic at a low speed as a main power source and uses an engine which has a relatively good high torque characteristic at a high speed as a main power source.

Therefore, in the hybrid vehicle, the engine which uses the fossil fuel stops at a low speed section and the motor/generator is used, so that it has excellent effect to improve fuel consumption and reduce exhaust gas.

However, as an electric vehicle mode section of the hybrid vehicle, the electric vehicle mode is increased and requested output of the motor/generator is increased. However, the size increase of the motor/generator is restricted due to limitation of a layout.

Therefore, the hybrid vehicle of the related art uses the output of the motor/generator in a restricted package, so that a cooling performance of the motor/generator has emerged as a very important issue.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a hydraulic pressure supply system of an automatic transmission for a hybrid vehicle which generates a hydraulic pressure supplied to a high pressure part and a low pressure part and then additionally supplies the remaining oil flow to a motor/generator by a direct injection method, thereby improving a cooling performance of the motor/generator.

Another aspect of the present invention provides a hydraulic pressure supply system of an automatic transmission for a hybrid vehicle which reduces a size of the motor/generator by improving the cooling performance of the motor/generator, thereby manufacturing a hybrid vehicle which reduces the cost and satisfies the layout.

An embodiment of the present invention provides a hydraulic pressure supply system of an automatic transmission for a hybrid vehicle which pumps oil stored in an oil pan by a high hydraulic pressure in an oil pump to supply the oil to a high pressure part and a low pressure part, the hydraulic pressure supply system including a separate motor/generator cooling route which uses an oil flow which is recirculated in a line regulator valve which controls a hydraulic pressure supplied from the oil pump to be a high stable line pressure to supply the hydraulic pressure to the high pressure part and the low pressure part and an oil flow which is recirculated in a reducing valve which controls a hydraulic pressure which is supplied from the line regulator valve to the low pressure part to be a reduced pressure to be supplied to the cooler, as a cooling oil of the motor/generator.

The oil pump may be configured by an electromechanical oil pump which is driven by an electromechanical motor and pumps and discharges oil stored in an oil pump by a high hydraulic pressure.

A mechanical oil pump which is driven by an engine and an electromechanical oil pump which is driven by an electromechanical motor may be simultaneously applied to the oil pump.

An oil flow of a low pressure part oil passage cooled in the cooler may be supplied to the Sow pressure part through an oil jacket in the motor/generator.

Further, the oil flow recirculated from the line regulator valve and the reducing valve may be supplied to a spray nozzle disposed outside the motor/generator.

According to an embodiment of the present invention, the motor/generator may be doubly cooled by internal oil jacket circulation and external direct injection mode, so that the cooling of the motor/generator may be maximized. Further, according to an embodiment of the present invention, the output of the motor/generator is increased by improving the cooling performance, without increasing the size of the motor/generator, so that the motor/generator may be downsized and thus a hybrid vehicle which reduces costs and satisfies a layout may be manufactured.

According to an embodiment of the present invention, the efficiency of the motor/generator is maintained to be good by improving the cooling performance of the motor/generator, so that fuel consumption may be improved.

According to an embodiment of the present invention, an electromechanical oil pump is controlled to increase a supplied discharged oil flow to a line regulator valve regardless of an engine and vehicle speed to significantly increase the remaining oil flow, thereby controlling the cooling of the motor/generator.

In addition, effects which may be achieved or expected by the embodiment of the present invention may be directly or implicitly disclosed in detailed description of the embodiment of the present invention. Various effects expected according to an embodiment of the present invention will be disclosed in the following detailed description.

DETAILED DESCRIPTION OF EMBODIMENTS

Figure 1:
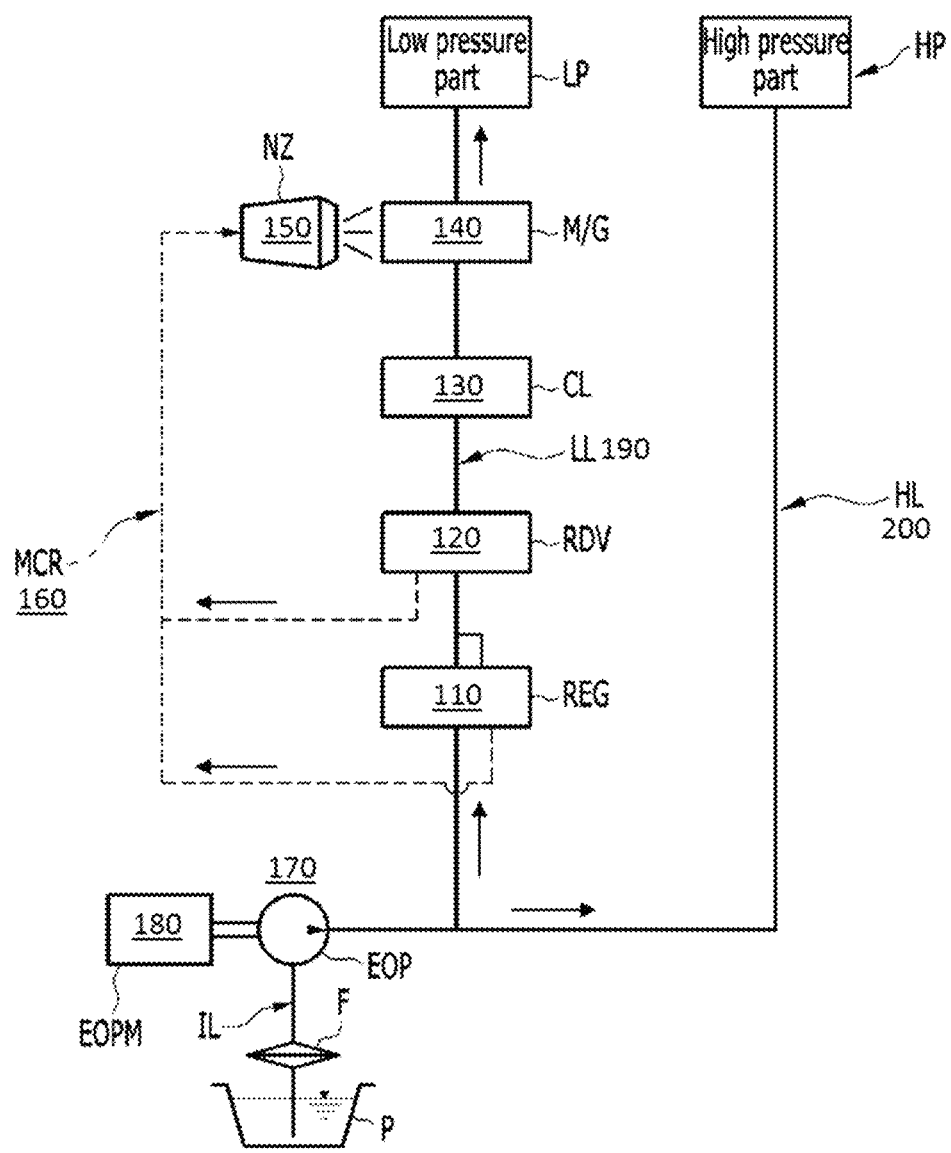
FIG. 1 is a view of a hydraulic pressure flow of a hydraulic pressure supply system of an automatic transmission for a hybrid vehicle according to an embodiment of the present invention.

Hereinafter, the present invention will be described more fully hereinafter in connection with its embodiments with reference to the accompanying, drawings, in which example embodiments of the invention are shown. As those skilled in the art would realize, the described embodiments may be modified in various different ways, all without departing from the spirit or scope of the present invention.

The drawings and description are to be regarded as illustrative in nature and not restrictive, like reference numerals designate like elements throughout the specification. In the following description, dividing names of components into first, second and the like is to divide the names because the names of the components are the same as each other and an order thereof is not particularly limited.

Figure 2:
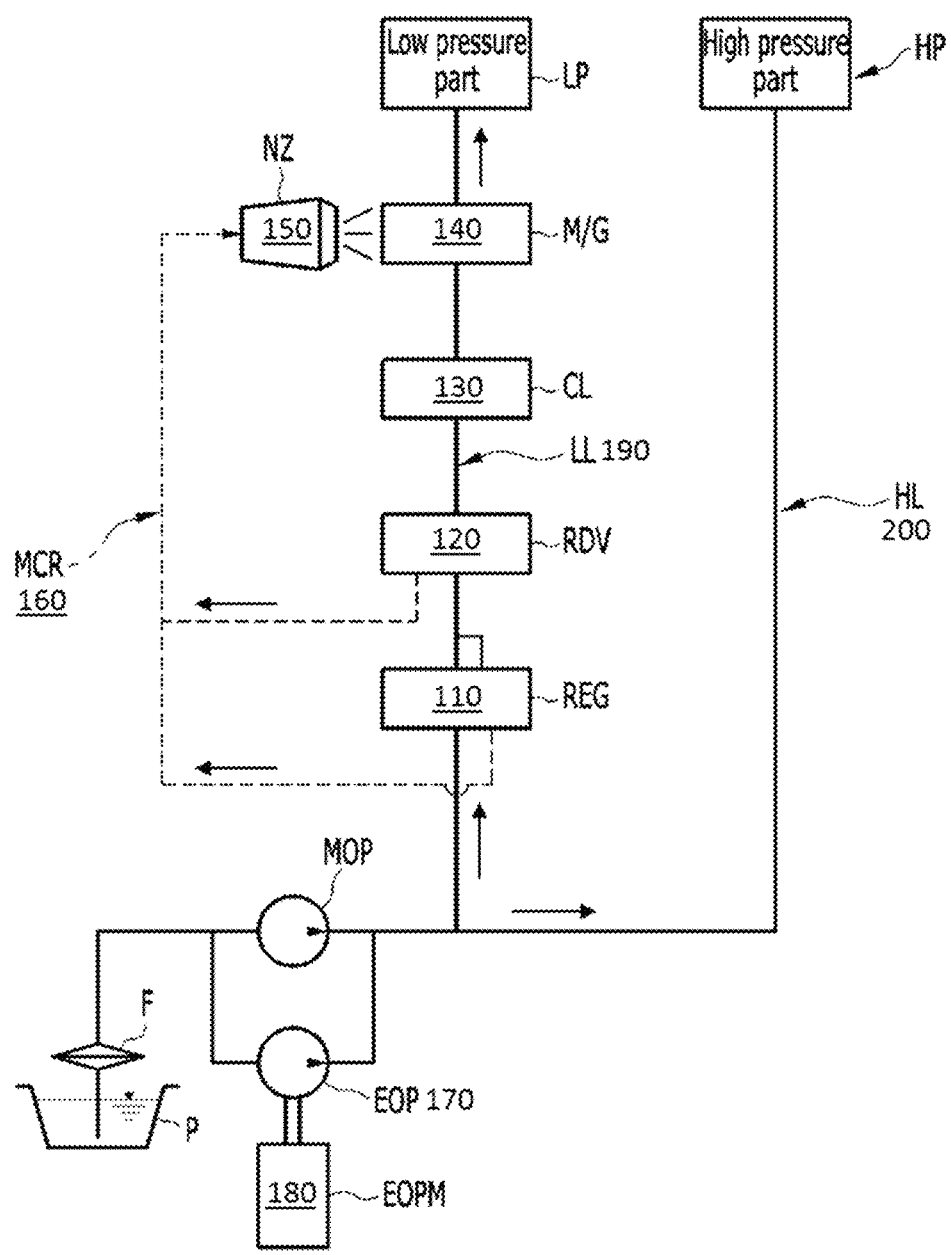
FIG. 2 is a view of a hydraulic pressure flow of a hydraulic pressure supply system of an automatic transmission for a hybrid vehicle according to an embodiment of the present invention.
Figure 3:
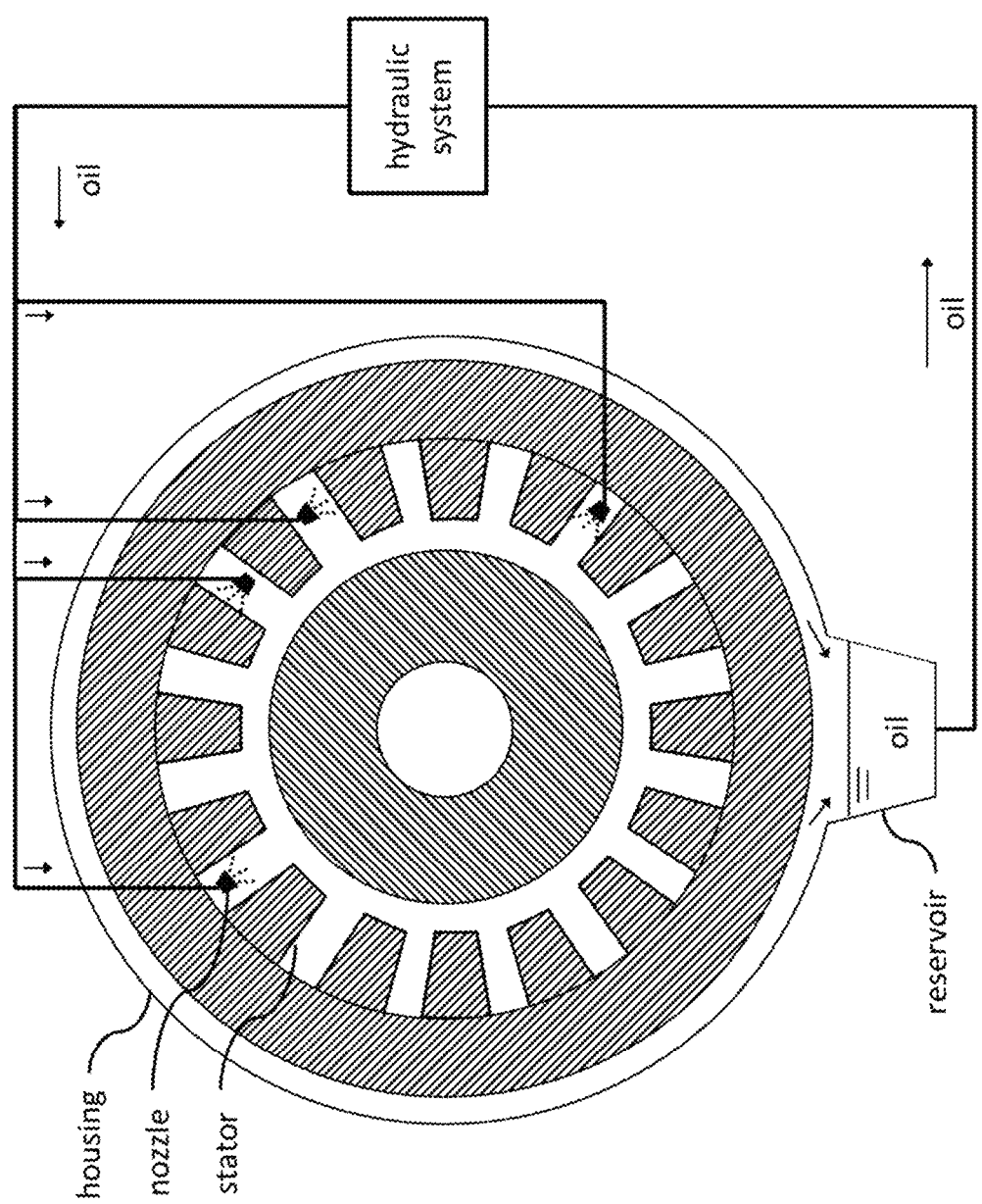
FIG. 3 illustrates a motor according to an embodiment of the present invention.

FIGS. 1 and 2 illustrate a hydraulic pressure supply system for an electric or hybrid vehicle that has at least one motor generating driving force for the vehicle. The system includes a fluid circuit for supplying and circulating a hydraulic fluid, e.g., transmission oil of the vehicle. In embodiments, the hydraulic pressure supply system includes a pathway for cooling the at least one motor using the fluid and a fluid cooler for cooling the fluid in the circuit.

In the illustrated embodiments of FIGS. 1 and 2, the fluid circuit includes a fluid pump 170, 180 that pressurizes and supplies the fluid to parts of the vehicle. In the embodiments, the fluid circuit includes a low pressure pathway 190 (LL) supplying the fluid at low pressure to some parts requiring low hydraulic pressure. Further in the embodiments, the fluid circuit includes a high pressure pathway 200 (HL) supplying the fluid at high pressure higher than the lower pressure to other parts requiring high hydraulic pressure. Initially, the pump 170, 180 supplies the same pressure fluid to the low pressure pathway 190 and the high pressure pathway 200, The pressure is reduced in the low pressure pathway 190.

In embodiments, the motor 140 is to generate primary driving force for the vehicle. The motor 140 can be also referred to as motor-generator or motor/generator. The motor includes a rotor and a stator installed in an enclosed space of a motor housing. In embodiments, the motor housing provides a hollow space for receiving the stator and rotor. In embodiments, the stator includes multiple stator pieces that are arranged along inner surface (inner circumference) of the motor housing. The rotor is placed inside the motor housing such that the rotor is surrounded by the stator pieces. The rotor is to rotate about its axis. In some embodiments, the motor housing includes a cooler jacket including one or more fluid passages. In some other embodiments, the motor further includes a stator ring, which is in a cylindrical shape elongated along the axis and installed within the hollow space of the motor housing. In the embodiments having the stator ring, the stator pieces are arranged along an inner surface (inner circumference) of the stator ring. In embodiments, the stator ring includes a cooler jacket including one or more fluid passages.

In embodiments, the low pressure pathway 190 includes a pressure regulator 110 to regulate the fluid pressure in the low pressure pathway. In the illustrated embodiments, the low pressure pathway includes a first flow in which the fluid from the regulator 110 is supplied to reducing valve 120 and cooler 130, motor 140 and low pressure part. In the first flow, the fluid entering the motor 140 is supplied to an inlet (not shown) of the cooler jacket in the motor, flows through the one or more fluid passages and is discharged from an outlet (not shown) of the cooler jacket to be supplied to the low pressure part. The fluid flowing through the one or more fluid passages cools the motor and reduces temperature of the motor.

In the illustrated embodiments, the fluid in the first flow from the regulator 110 is supplied to reducing valve 120 and cooler 130, motor 140 and low pressure part in sequence. In other embodiments, the first flow may have a different sequential arrangement of the reducing valve 120 and cooler 130 motor 140 and low pressure part. For example the motor 140 may be between the reducing valve 120 and cooler 130, and the low pressure part may be between the cooler 130 and motor 140.

In embodiments, the low pressure pathway 190 further includes a second flow 160 to supply the fluid to inside the motor 140. In embodiments, the second flow 160 draws the fluid from the regulator 110 or the reducing valve 120. In embodiments, the second flow 160 has one or more sprayers installed inside the motor 140, for example between stator pieces. The fluid supplied to the sprayer(s) is sprayed toward parts inside the motor including the stator to cool the parts inside the motor. In embodiments, the motor 140 includes a reservoir at its lower (bottom) portion for collecting fluid within the motor housing. In embodiments, the fluid collected from inside the motor is discharged from the motor to return to the low pressure pathway 190. In embodiments, the discharged fluid from the second flow is combined with the fluid from the first flow outside the motor 140 and supplied to the low pressure part or other components of the low pressure pathway.

FIG. 1 is a view of a hydraulic pressure flow of a hydraulic pressure supply system of an automatic transmission for a hybrid vehicle according to an embodiment of the present invention.

Referring to FIG. 1, a hydraulic pressure supply system of an automatic transmission for a hybrid vehicle according to an embodiment of the present invention is configured such that a hydraulic pressure generated in an electronic oil pump EOP is controlled to be a high stable hydraulic pressure in a line regulator valve REG to be supplied to a high pressure part HP through a part of a high pressure part oil passage HL and some of the hydraulic pressure is controlled to be a low hydraulic pressure to be supplied to a low pressure part LP through a low pressure part oil passage LL.

The electromechanical oil pump EOP is driven by a separate electromechanical motor EOPM and is connected to an oil pan P through a suction path IL.

On the suction path IL, a filter F is disposed to filter impurities included in the oil to supply clean oil to the electromechanical oil pump EOP.

The line regulator valve REG stably controls the hydraulic pressure supplied from the electromechanical oil pump (EOP) to be a line pressure and the hydraulic pressure controlled by the line regulator valve REG is supplied to a high pressure part HP and a low pressure part LP.

The hydraulic pressure which is supplied to the high pressure part HP from the line regulator valve REG requires enough high pressure to smoothly operate a plurality of frictional members which selectively operate at the time of changing a speed.

The hydraulic pressure which is supplied to the low pressure part LP from the line regulator valve REG requires sufficient low pressure to smoothly cool and lubricate the engine. Therefore, the hydraulic pressure is stably controlled to be reduced by the reducing valve RDV to be supplied to a cooler CL and is cooled in the cooler CL to cool the motor/generator M/G while circulating an internal oil jacket of the motor/generator M/G and then be supplied to the low pressure part LP, to cool and lubricate other components.

In the above-described hydraulic pressure supply system, according to the embodiment of the present invention, a separate motor/generator cooling route MCR is configured to supply an oil flow which is recirculated during a hydraulic pressure control process of the line regulator valve REG and the reducing valve RDV to a spray nozzle NZ disposed outside the motor/generator M/G to directly spray the oil flow to the motor/generator M/G, thereby effectively cooling the motor/generator.

That is, in the related art, the oil flow which is recirculated during the hydraulic pressure control process of the line regulator valve REG and the reducing valve RDV returns to an oil upstream side or an oil pan P. In contrast, in the embodiment of the present invention, the recirculated oil flow is supplied to the spray nozzle NZ disposed outside the motor/generator M/G to be directly sprayed onto the motor/generator M/G.

In the above description, a configuration of the line regulator valve REG and the reducing valve RDV and generation of the recirculated oil flow during the control process are well known to those skilled in the art, so that the detailed description will be omitted.

FIG. 2 is a view of a hydraulic pressure flow of a hydraulic pressure supply system of an automatic transmission for a hybrid vehicle according to an embodiment of the present invention.

Referring to FIG. 2, two oil pumps are applied to a hydraulic pressure supply system of an automatic transmission for a hybrid vehicle according to an embodiment of the present invention.

That is, in the embodiment illustrated in FIG. 1, the electromechanical oil pump EOP is used as a main pump and in the embodiment illustrated in FIG. 2, a mechanical oil pump MPO which is driven by an engine is used as a main pump and an electromechanical oil pump EOP which is driven by an electromechanical oil pump motor EOPM is used as a sub pump. However, in both embodiments, a flow of a downstream side hydraulic pressure of the mechanical and electromechanical oil pumps MOP and EOP is the same. Therefore, detailed description thereof will be omitted.

Further, according to the embodiment of FIG. 2, in the hydraulic pressure supply system having both the mechanical oil pump MOP and the electromechanical oil pump EOP, as illustrated in FIG. 2, hydraulic pressures pumped from the mechanical oil pump MOP and the electromechanical oil pump EOP are joined onto a predetermined oil passage or independently supplied to the high pressure part HP and the low pressure part LP.

In this case, when the hydraulic pressure pumped from the mechanical oil pump MOP and the electromechanical oil pump EOP is joined to be supplied, a hydraulic circuit may be configured as described in embodiments. When the hydraulic pressure which is pumped from the mechanical oil pump MOP and the electromechanical oil pump EOP is independently supplied to the high pressure part HP and the low pressure part LP, an oil flow recirculated from the line regulator valve REG disposed in each of the high pressure part HP and the low pressure part LP is supplied to the spray nozzle NZ disposed outside the motor/generator M/G.

As described above, according to the hydraulic pressure supply system of an automatic transmission for a hybrid vehicle according to the embodiment of the present invention, the motor/generator M/G may be doubly cooled by internal oil jacket circulation and external direct injection mode, so that the cooling of the motor/generator M/G may be maximized.

Further, according to the hydraulic pressure supply system of an automatic transmission for a hybrid vehicle according to an embodiment of the present invention, the output of the motor/generator M/G is increased by improving the cooling performance, without increasing the size of the motor/generator M/G, so that the motor/generator M/G may be down-sized and thus a hybrid vehicle which reduces costs and satisfies a layout may be manufactured.

According to the hydraulic pressure supply system of an automatic transmission for a hybrid vehicle according to an embodiment of the present invention, the efficiency of the motor/generator M/G is maintained to be good by improving the cooling performance of the motor/generator M/G, so that fuel consumption may be improved.

According to the hydraulic pressure supply system of an automatic transmission for a hybrid vehicle according to an embodiment of the present invention, an electromechanical oil pump EOP is controlled to increase a supplied discharged oil flow to a line regulator valve REG regardless of an engine and vehicle speed to significantly increase the remaining oil flow, thereby controlling the cooling of the motor/generator M/G.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

CL . . . Cooler
EOP . . . Electromechanical oil pump
HL . . . High pressure part oil passage
HP . . . High pressure part
LL . . . Low pressure part oil passage
LP . . . Low pressure part
M/G . . . Motor/generator
MCR . . . Motor/generator cooling route
MOP . . . Mechanical oil pump
NZ . . . Spray nozzle
RDV . . . Reducing valve
REG . . . Line regulator valve

What is claimed is:

1. A hydraulic pressure supply system of an automatic transmission for a hybrid vehicle which pumps oil stored in an oil pan by a high hydraulic pressure in an oil pump to supply the oil to a high pressure part and a low pressure part, the hydraulic pressure supply system, comprising:

a separate motor/generator cooling route which uses an oil flow which is recirculated in a line regulator valve which controls a first hydraulic pressure supplied from the oil pump to be a high stable line pressure to supply the first hydraulic pressure to the high pressure part and the low pressure part and an oil flow which is recirculated in a reducing valve which controls a second hydraulic pressure which is supplied from the line regulator valve to the low pressure part to be a reduced pressure to be supplied to a cooler, as a cooling oil of the motor/generator, wherein an oil flow of a low pressure part oil passage cooled in the cooler is supplied to the low pressure part through an oil jacket in the motor/generator.

2. The hydraulic pressure supply system of claim 1, wherein the oil pump is configured by an electromechanical oil pump which is driven by an electromechanical motor and pumps and discharges oil stored in the oil pan by a high hydraulic pressure.

3. The hydraulic pressure supply system of claim 1, wherein a mechanical oil pump which is driven by an engine and an electromechanical oil pump which is driven by an electromechanical motor are simultaneously applied to the oil pump.

4. The hydraulic pressure supply system of claim 1, wherein the oil flow recirculated from the line regulator valve and the reducing valve is supplied to a spray nozzle disposed outside the motor/generator.

* * * * *